United States Patent [19]

Powell

[11] Patent Number: 4,805,031

[45] Date of Patent: Feb. 14, 1989

[54] IMAGE PROCESSING METHOD AND APPARATUS USING MOVING ONE-DIMENSIONAL TRANSFORMS

[75] Inventor: Philip G. Powell, Middlesex, England

[73] Assignee: Eastman Kodak Company, Rochester, N.Y.

[21] Appl. No.: 162,393

[22] PCT Filed: Jun. 2, 1987

[86] PCT No.: PCT/EP87/00292

§ 371 Date: Jan. 28, 1988

§ 102(e) Date: Jan. 28, 1988

[87] PCT Pub. No.: WO87/07740

PCT Pub. Date: Dec. 17, 1987

[30] Foreign Application Priority Data

Jun. 11, 1986 [GB] United Kingdom ............... 8614214

[51] Int. Cl.$^4$ ..................... H04N 1/00; H04N 5/213
[52] U.S. Cl. ................... 358/284; 358/166; 358/167
[58] Field of Search ............ 358/282, 284, 166, 167, 358/168

[56] References Cited

U.S. PATENT DOCUMENTS 4,553,165 11/1985 Bayer .......................... 358/166

Primary Examiner—James J. Groody
Assistant Examiner—Kim Y. Vu
Attorney, Agent, or Firm—Raymond L. Owens

[57] ABSTRACT

A method of processing an image for noise reduction, comprising the steps of: (a) generating from the image an array of pixel image values representative of the light values of its pixels; (b) grouping the pixel image values into groups corresponding to groups of pixels aligned along a predetermined direction; (c) processing a group of pixel image values using a transform algorithm and a thresholding operation to separate image components from noise components; (d) repeating step (c) with each group of pixel image values corresponding to groups of pixels aligned along the predetermined direction, the position of which group is translated by a fixed number of pixels with respect to the preceding group; (e) accumulating and averaging the image value components from every group contributing to each image element so as to provide an array of processed pixel image values having a partially reduced noise component; (f) repeating steps (b) to (e) with groups of pixel images values having noise components partially reduced by the former processing steps, these groups of pixel image values corresponding to groups of pixels aligned along a succession of other directions, whereby the noise component of the image is effectively reduced.

6 Claims, 3 Drawing Sheets

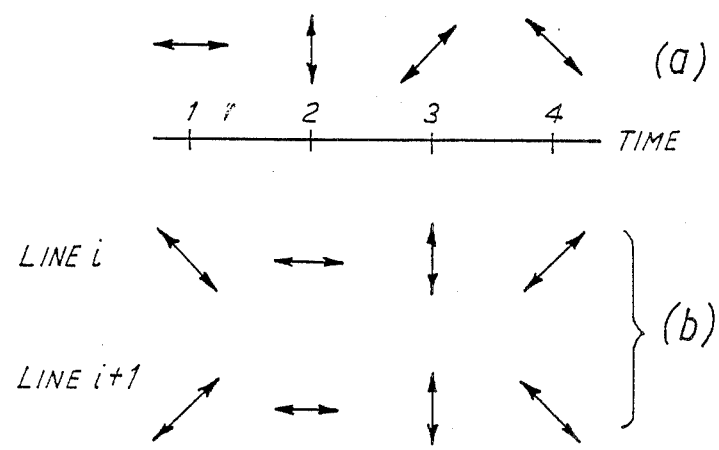
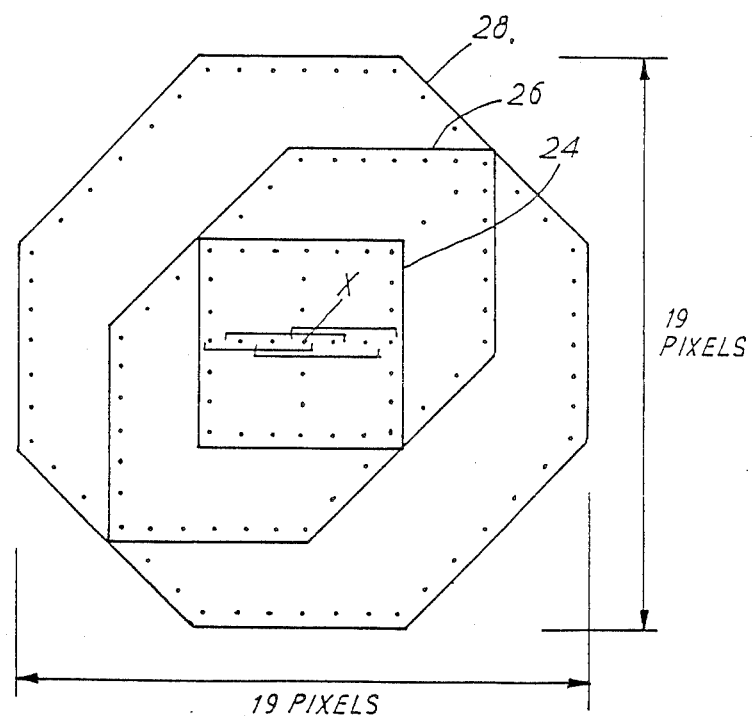

IMAGE PROCESSING METHOD AND APPARATUS USING MOVING ONE-DIMENSIONAL TRANSFORMS

The present invention relates to image processing methods and apparatus for reducing noise and increasing sharpness in an image reconctructed from processed image signals generated by scanning and sampling an original image. More specifically, the invention pertains to such methods and apparatus in which sets of image element signals are processed using one-dimensional transforms applied to one-dimensional "windows" or image elements scanning the original image in a succession of various window orientations.

Photographic images, for example, are often impaired by unwanted non-image components such as graininess, commonly referred-to in the art of electronic image processing as "noise". To remove or, at least, reduce this unwanted component, various attempts have been made, one of which consists of dividing up the original image into image elements or "pixels", determining image values representative of the content of these pixels, processing these pixel image values so as to remove or reduce unwanted components in these values and then reconstructing a noise-free entire image from these "cleaned" image values. The processing of the image values broadly consists in replacing each pixel image value by a modified value, using the various image values within a field surrounding the pixel in order to form these modified values. The original pixel image values are used to form a number of different linear combinations, each of which represents a different component of the image structure within the field, and most of which represent components of the detail within the field. Each of these detail-sensitive combinations tends to vanish in the absence of a particular kind of image detail. Noise is reduced by modifying the detail sensitive combinations such that, for example, the value of a combination is lowered or set to zero whenever a particular kind of image detail is not present ot a significant degree. The modified pixel iage values are formed from these noise-reduced detail sensitive combinations.

One known way to build the above mentioned set of different linear combinations of pixel image values consists in applying to a set of values from $(n \times m)$ or "(n by m)", neighbouring pixels a mathematical $(n \times m)$ transform such as a Haar or Walsh-Hadamard transform. By dividing a full original image into adjacent blocks of $(n \times m)$ pixels and processing each block as per above, a full image can be processed and a noise-reduced image reconstructed.

Unfortunately, there is also a disadvantage associated with dividing the image into blocks. After processing, the reconstructed image may exhibit visible boundaries between adjacent blocks, giving a checkerboard appearance to that image, a feature unacceptable for high qualityimage reproduction.

U.S. Pat. No. 4,442,454 in the name of Philip G. Powell discloses an image processing method for reducing noise, which represents a substantial step forward in order to solve this difficulty. This method combines a block overlap transform process and a multistage procedure to overcome the problem of boundary visibility. According to that method, the image values within a small $(n \times m)$ "window" of pixels are transformed using a two-dimensional mathematical transform. The transformed image values are then thresholded to remove the small values that are primarily associated with noise, and the remainder are inverse transformed so as to regenerate a window of noise-reduced values. The window ismoved pixel by pixel, row-wise and column-wise, over the whole image, and the final value for each pixel is the average of $(n \times m)$ values derived from $(n \times m)$ overlapping windows. By this means the artefacts associated with fixed window boundaries are avoided (and those associated with thresholding the transformed values in each transform operation are reduced). According to the above-mentioned U.S. patent, the usefulness of this procedure is then increased by cascading several successive processing stages so as to build up larger windows fromarrays of smaller windows. These larger windows are necessary in order to reduce noise adequately in uniform areas. Cascading minimizes the computation load and allows the use of large windows to handle low spatial frequency detail and, at the same time, small windows for high spatial frequency detail.

Although the performance of the method disclosed in the above mentioned U.S. patent is considerably better than that of earlier methods, it appears still inadequate for some image configurations such as those with diagonal patterns. Also, in uniform areas where noise is most visible, there remains a residual noise having a patterned appearance, characteristic of one or more of the component vectors of the transform used.

An object of the present invention is to provide a sampled image processing method for noise reduction which leads to less distortion of image detail than is obtained with prior art methods.

Another object of the invention is to provide such a method which reduces the occurrence of patterned artefacts in areas of noise only.

Still another object of the invention is to provide such a method not so closely tied to the row and column directions of the sampling pattern and to the block transform of the method disclosed in Powell U.S. Pat. No. 4,442,454.

These and other objects of the present invention are obtained with a method of processing an image for noise reduction, comprising the steps of:

a. generating from the image an array of pixel image values representative of the light values of its pixels;

b. grouping the pixel image values into groups corresponding to groups of pixels aligned along a predetermined direction;

c. processing a group of pixel image values using a transform algorithm and a thresholding operation to separate image components from noise components;

d. repeating step c. with each group of pixel image values corresponding to groups of pixel aligned along the predetermined direction, the position of which group is translated by a fixed number of pixels with respect to the preceding group;

e. accumulating and averaging the image value components from every group contributing to each image element so as to provide an array of processed pixel image values having a partially reduced noise component;

f. repeating steps b. to e. with groups of pixel image values having noise components partially reduced by the former processing steps, these groups of pixel image values corresponding to groups of pixels aligned along a succession of other directions, whereby the noise component of the image is effectively reduced.

To carry out the image processing method according to the present invention, an apparatus is provided comprising means for sampling the brightness values of an image at a regular array of locations referred to herein as pixels, and providing an orderly sequence of pixel image values as input to means for processing said values according to the present method and generating a sequence of modified image values that correspond to sampled brightness values of a noise-reduced image.

FIG. 1 is a block diagram of the major features of the block transform method for reducing noise disclosed in the above-mentioned Powell U.S. Pat. No. 4,442,454;

FIG. 3 illustrates various pixel windows providing image values processed successively by means of a moving transform for noise supression, according to the method of the present invention;

FIG. 4 shows various concentric pixel arrays used to explain the extent of the contribution of any one pixel value to the replacement value of tis neighbours, as obtained by the method of the present invention.

The input signal in the following description is generated by the scanning and sampling of an original image. For purposes of describing the preferred embodiments, this input is assumed to be generated from an image such as a negative or positive photographic transparency. It is further understood that such a signal may represent a variety of spatial components of the image, including an average light value, fine detail such as sharp edges, lines and textures, intermediate detail such as less sharp edges and small features, and coarse detail such as shaded modeling and other gradually varying features. (Modeling as here used refers to the rendition of smoothly varying features or details). In addition, the signal includes a noise component affecting most of the spatial components to some degree. With a photographic transparency, much of such noise originates with the random distribution of the light-absorbing particles that form the basis of this image-recording system. While the invention will be described in connection with sampled data from a photographic transparency, it should be understood that the input signal can represent other information or data such as would be derived from directly scanning an object, froma composite video signal, or from image information in optical, electrical or magnetic storage. In such cases noise may originate in other characteristics of the signal generating system.

Figure 1:
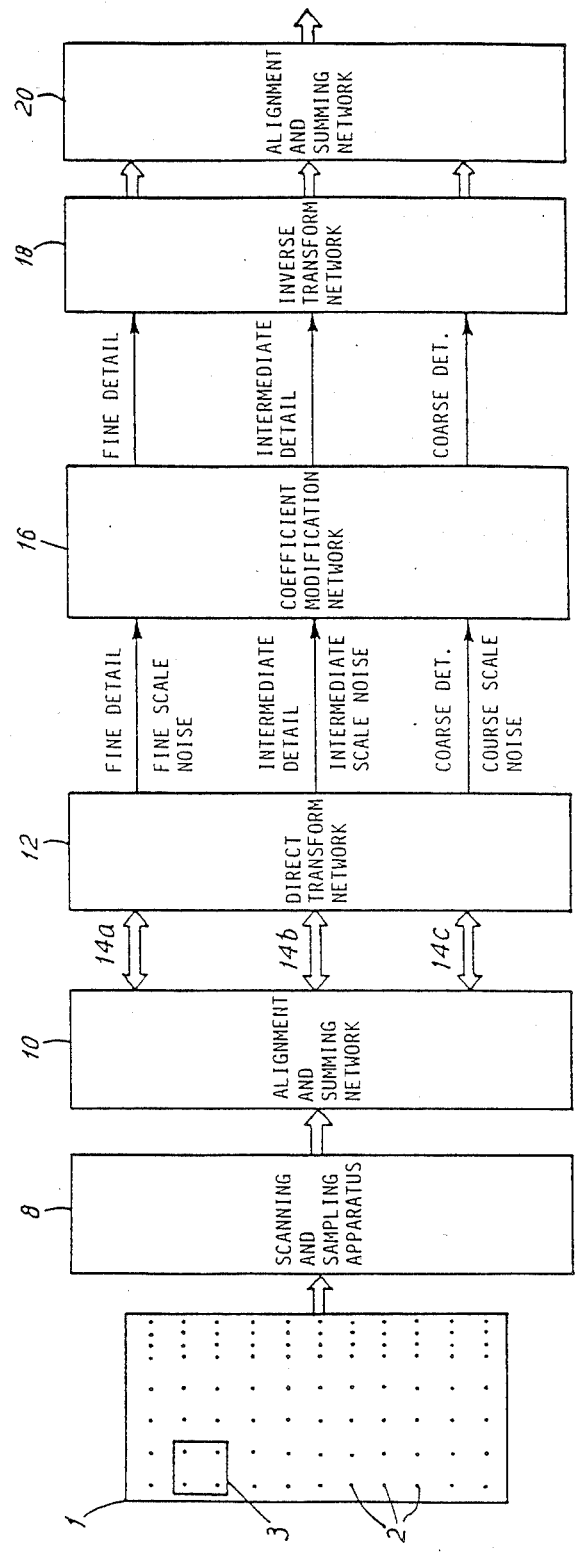

For a full understanding of the present invention, it is thought useful to come back briefly to particulars of the noise suppression method disclosed in Powell U.S. Pat. No. 4,442,454, in connection with the diagram of FIG. 1.

The image to be pocessed is dissected into a two-dimensional pattern 1 of pixels or pixels 2, arranged row-wise and column-wise so as to cover the full image to be processed fornoise suppression. Signals representative of local image values at these pixel positions are obtained by means of a scanning and sampling apparatus 8 comprising, for example, a light sensitive CCD array, as is well known in the art.

A sequence of image values representative of the pixels or pixels of the sampled image are presented to an alignment and summing network 10 as a stream of successive image values. The alignment and summing network 10 (a) groups a set of image values selected from this sequence and corresponding to a block of pixels suitable for block transformation, (b) provides this group of values for processing in a hierarchy of ordered successive steps, (c) provides a continuous stream of such groups corresponding to overlapping blocks of pixels, each displaced by at least one pixel with respect to the preceding block.

According to the method of the above mentioned U.S. patent, a rectangular block 3 of (n×m) pixels provides, through netowrk 10, a set of (n×m) pixel image values which are mathematically transformed in network 12 into a corresponding set of (n×m) coefficients, using a (n×m) transform which, typically, is a Walsh-Hadamard transform.

These coefficients are individually "cored" in a coefficient modification network 16 so as to provide another set of (n×m) cored coefficients retaining only noise-reduced image information. The block of cored coefficients is theninverse-transformed in network 18 and used to reconstruct a noise-reduced image through an alignment and summing network 20.

This "core and add" technique of noise reduction can be replaced by a "clip and subtract"0 technique, as explained in the above mentioned U.S. patent.

The above series of computations is repeated for all overlapping (n×m) pixel blocks translated by a predetermined number of pixels (typically one) with respect to the former block, row-wise and column-wise, over the full extent of the dissected image. The modified image values of the overlapping blocks are then summed and averaged so as to produce a full noise-reduced image.

Several cascaded lowpass versions of these blocks are processed as per above in channels 14a, 14b, 14c, to remove or reduce graininess of various spatial frequencies (corresponding to fine, intermediate and coarse details, respectively).

This prior art method provides results of interest but, nevertheless, the use of a block transform based on a 2—dimensional vector set that is separable into vertical and horizontal 1—dimensional vectors, is detrimental to the reproduction of diagonal patterns in the wanted image. Diagonal structures are particularly affected because they are represented by a larger number of coefficients than horizontal or vertical image information. Their contribution to each coefficient is therefore reduced to a level closer to the thresholding level and is more likely to be processed as noise, to the detriment of the diagonal information. Also the remaining transform coefficients are responsible for some residual vertical and horizontal patterns in noise-only areas.

According to the present invention, these artefacts are avoided by providing a method of processing an image for noise reduction which makes successive use of mathematical transforms acting on groups of image values derived from one-dimensional pixel groups having varying spatial orientations.

Figure 2:
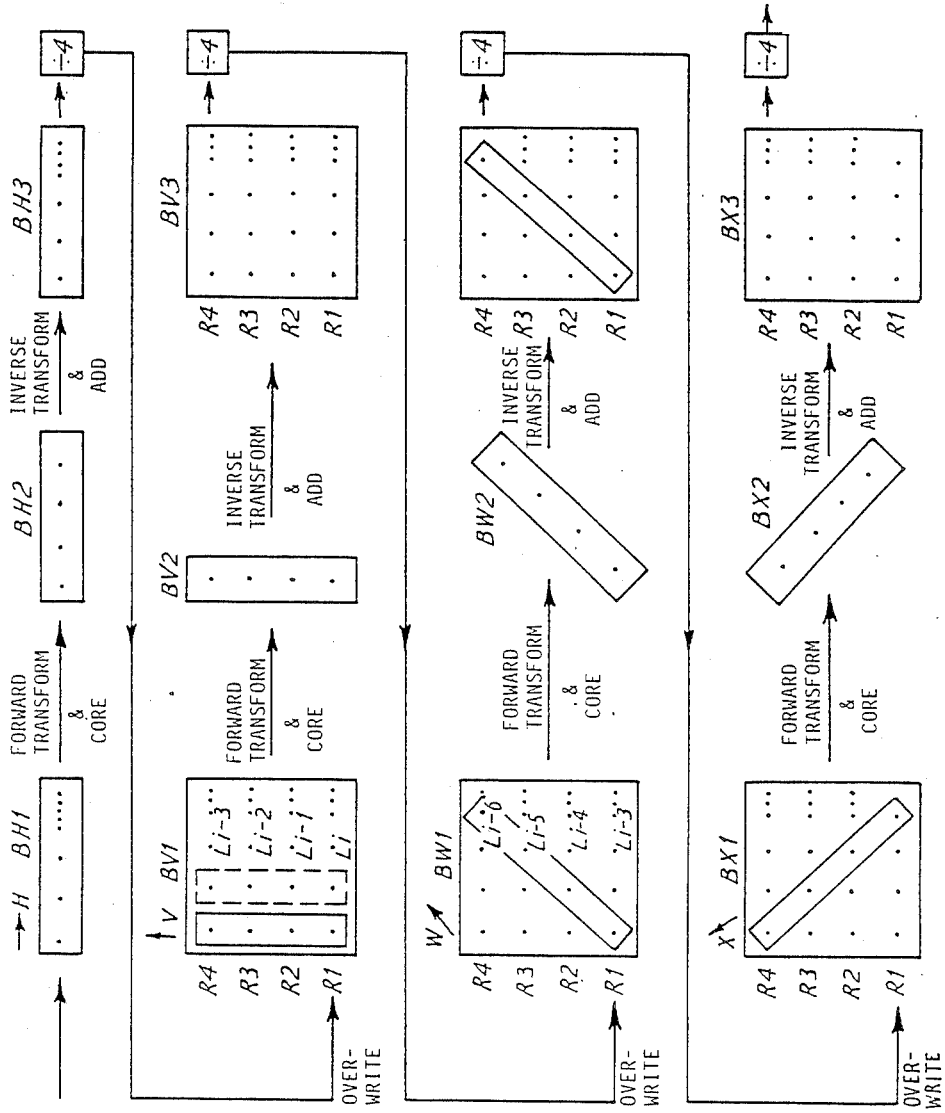
FIG. 2 illustrates diagrammatically the various steps of the image processing method according to the present invention, using a moving transform applied to one-dimensional "windows" of pixels.
Figure 2:
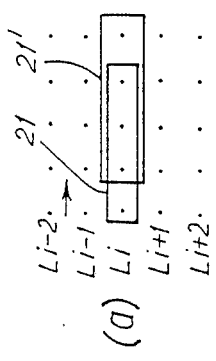

FIG. 2 is a diagram illustrating a "moving" transform noise reduction method in four steps, in accordance with the present invention. While four steps are described in connection with FIG. 2, a different number of steps may be used in accordance with the invention. Each step is capable of processing all the groups of image values provided by groups of pixels aligned ina common direction. Pixel image values related to the brightness (light) values of respective elements of an original image are generated by a scanning and sampling apparatus (not shown). A sequence of values represneting these elements of the sampled image are presented to an alignment network (not shown) as a stream of successive pixel image values. The alignment netowrk (a) arranges the image values selected from this sequence into groups corresponding to one-dimensional (rectilinear) groups of pixels suitable for mathematical transformation, (b) provides such image value groups of selected orientations for processing in a hierarchy of successive steps, each of which is orderly related to the preceding step, and (c) provides a continuous stream of such groups corresponding to one-dimensional groups of pixels, each translated by at least one pixel with respect to the preceding group.

Basically, rather than using a two-dimensional transform, as described in Powell U.S. Pat. No. 4,442,454, the invention consists in applying to image values representative of image pixels, a succession of moving transforms acting on image values drawn from rectilinear groups of pixels of various orientations, in coring the transform coefficients for noise reduction and inverse transforming themodified coefficients to reconstruct the image. Alternatively, a "clip and subtract" technique suchas disclosed in the above mentioned U.S. patent, may be used to reconstruct the image.

The various steps of the method acording to the present inventionwill now be described with reference to FIG. 2.

Consider current line $L_i$ of pixels of the original image pixel array comprising m lines of pixels $L_1$ to $L_m$. Each line of this original array is copied, in turn, into a one-row buffer BH1, the row having the same length as the image array (FIG. 2a).

Consider now a group 21 of four adjacent pixels of line $L_i$. A mathematical transform network such as a direct slant transform network, for example, is used to obtain four coefficients from combinations of the corresponding image values kept in row $R_1$ of buffer BH1 and corresponding to the pixels of group 21. These coefficients are stored in corresponding locations of buffer BH2. They are then "cored" in a coefficient modification network, by setting values below respective thresholds to zero. The cored coefficients are then inverse transformed and the resulting image values are added into the corresponding four locations of a one-row buffer BH3 which has been precleared.

This procedure is repeated along the whole line with successive groups 21, 21', ... of four pixel image values corresponding to groups of four pixels displaced by one pixel with respect to the preceding group and the results are added into buffer BH3. The summed values in this buffer are divided by four to average the contributions to each pixel image value from the overlapping groups 21, 21', ... so that buffer BH3 contains a full "row" or image values which have been enhanced "horizontally". The image values in buffer BH3 are now moved (with overwriting) into row R1 of a four-row rotating buffer BV1.

In order that the image values corresponding to pixels near the ends of the line should have four contributions it is necessary to process groups that overlap the ends of the line and that are filled with nominal pixel image values, for example with zeros or with average values.

It is to be understood that, when the row of horizontally enhanced image values is transferred from buffer BH3 into row $R_1$ of buffer BV1, the rows of horizontally enhanced image values corresponding to lines $L_{i-1}$, $L_{i-2}$, $L_{i-3}$ of the original image value array have been already transferred into buffer BV1, and with rotation of this buffer will be located in rows R2, R3 and R4 respectively, following similar sequences of operations and corresponding "rotations" of buffer BV1.

According to the method of the present invention, the image values held in buffer BV1 are now submitted to a second processing step involving groups of image values corresponding to groups of pixels oriented along a direction not aligned with the former one, for example a vertical direction V (FIG. 2b).

Each four-element column $C_1$, $C_2$, etc. in buffer BV1 is transformed to obtain four coefficients, and the four coefficients are overwritten into a four element buffer BV2. These coefficients are cored in a coefficient modification network and then inverse transformed and the result is added into column $C_1$, $C_2$etc. of four-row rotating buffer BV3. When every column in buffer BV1 has been processed in this way, buffers BV1 and BV3 are rotated, and the first row of BV3 is cleared. A new line of image values is overwritten into row $R_1$ of buffer BH1, the line of horizontally processed values from BH3 is overwritten into row $R_1$ of buffer BV1, and the procedure repeated. After four repetitions, row R4 of buffer BV3 contains the sum of four contributions from four overlapping vertical groups. These values are divided by four and the results moved with overwriting into row R1 of a four-row rotating buffer BW1. This buffer contains four rows of image values enhanced "horizontally" and "vertically", successively transferred from row R4 of buffer BV3 to row $R_1$ of buffer BW1 and corresponding to lines $L_{i-3}$, $L_{i-4}$, $L_{i-5}$ and $L_{i-6}$ of the original image pixel array.

This procedure may be extended to other directions of the plane, by the use, for example, of groups of pixel image values corresponding to pixel groups aligned with direction w (FIG. 2c) or direction x (FIG. 2d). For eachof these directions w and x, the procedure consists in, as before, transferring the pixel image values line by line into a rotating four-row buffer BW1 or BX1 respectively, transforming, coring and inverse transforming the values ingroups of four using four element buffers BW2 or BX2, adding the results into a four-row buffer BW3 or BX3 after clearing the first row, and dividing the sum in the fourth row by four. Eventually if all four different directions are used successively the fourth row of the buffer BX3 contains image values enhanced successively along the four directions of the image plane. This row of image values can then be used to build up a modified image array corresponding to a noise-reduced version of the original image, by repeating the whole procedure until all rows of the original have been input to the row of buffer BH1. The n rows of image values $R_{ihvwx}(1 \leq i \leq n)$ thus obtained may be used then to reconstruct the image by means of a display device.

The enhanced image resulting from this basic procedure is however noticeably defective, in that there remains some residual streakiness aligned in the direction of the last operation. There are a number of ways in which this defect can be elimiated or reduced. For example, it can be eliminated by rotating the order (1, 2, 3, 4, see FIG. 3a), in which the four directions are processed in the four steps of each cycle. However, although full rotation removes the streakines, it worsens performance in other respects. The compromise of alternating the diagonal directions only, one of which is used in the first operation (1) and the other in the last operation (4), is more satisfactory (see FIG. 3b). This leaves a very slight streakiness in both diagonal directions, which is not obtrusive. Some reduction of the streakiness due to the last operation is also possible if the threshold levels for the later steps, and especially the last step, are lowered relative to those applied in the earlier steps. This lowering must not be taken too far however, as reduction in the streakiness of noise may be compensated by some appearance of streakiness in picture components that are just above threshold.

FIG. 4 shows several concentric pixel arrays useful to understand the extent of the contribution of any one pixel image value to the replacement value of its neighbours, if four-element transforms and four directions are used in this procedure as described.

If, as illustrated above, a moving one-dimensional 4 element slant transform is used to implement thenoise reductionmethod of the present invention, the first step is to orientate, for example, the window providing the group of pixel image values involved horizontally. With reference to FIG. 4, it appears that the central pixel makes a contribution to the replacement values of a horzontal string of seven pixels, acting as a $(7 \times 1)$ spatial filter. Similarly if the window is next orientated vertically, then as a result of both operations applied successively the effective overall filter shape is a square (24) corresponding to a $(7 \times 7)$ filter, as shown in FIG. 4. Now applying the moving transform using a window in the first diagonal direction (see FIG. 3a, direction 3), the filter shape becomes a hexagon 26 with 7-pixel long sides. Applying the transform in the final other diagonal direction (FIG. 3a, direction 4) results in the heptagonal filter shape 28 inscribed in a 19 pixel side square. For sake of clarity only the border pixels are shown in FIG. 4, for each filter shape. Finally it appears that each pixel contributes to the replacement values of the 277 pixels contained within outline 28.

A major advantage of the method according to the present invention is that it avoids the occurrence of objectionable patterns in the uniform picture areas where residual noise may still be visible. The residue from processing to remove random gaussian noise by this procedure tends to have the character of isolated spots, one or at most a few pixels across, which is likely to be less obtrusive than the vertical and horizontal linear patterns seen earlier. Changes in threshold level simply alter the frequency and distribution of these spots.

A second advantage is that diagonal patterns are reproduced more satisfactorily, and most other picture components are improved to some degree.

The present invention may be applied to a cascaded or multiple-stage system. I the form of a cascaded system as described in Powell U.S. Pat. No. 4,442,454, the input to each stage is generated by lowpass filtering the input to the previous stage and the baseband component of the transform is eliminated in the internal processing at each stage, leaving a bandpass output. Then the partial images available are processed in parallel. In this form the lowpass filter used to form the input to each stage must correspond prcisely to the baseband component eliminated from the previous stage. In a cascaded version of the moving one-dimensional transform procedure according to the present invention the original images values are filtered into a number of successive lowpass versions in the same way, and from these lowpass versions a complete set of bandpass versions are generated by differencing. Each of these bandpass versions of the image value array is then processed separately according to the present invention but with the baseband component of the transform in each step, which now represents a bandpass component of the original, included in the thresholding and inverse transformation operations.

As in the prior art method of Powell U.S. Pat. No. 4,442,454, the sample spacing of the transform vectors used at each stage in this procedure must be appropriate to the bandwidth at this stage.

Selection of the most favourable filter parameters for the generation of these versions will depend on the characteristics of the image structures to be processed.

In an alternative form of cascaded system the filtered images are processed in succession as follows. A series of lowpass images are generated as before by lowpass filtering and a set of images consisting of one lowpass and a series of bandpass images are formed by differencing. First. the lowpass image array is processed according to the present invention using a set of transform vectors with sample spacing appropriate to the bandwidth, leaving the baseband component of the transform unmodified. Second,the first bandpass image is added to this partially enhanced data, and the result reprocessed using sample spacing appropriate to the new bandwidth, again with the new baseband component unmodified. This process is repeated until all of the bandpass images have been processed, when a fully processed image is available. The advantage of this procedure is that any distortions of the image introduced by coring operations at each step of the procedure before the last one, are reprocessed by subseuent steps and the distortions reduced.

I claim:

1. A method of processing an image fornoise reduction, comprising the steps of :
   a. generating from the image an array of pixel image values representative of the light values of its pixels;
   b. grouping the pixel image values into groups corresponding to groups of pixels aligned along a predetermined direction;
   c. processing a group of pixel image values using a transform algorithm and a thresholding operationto separate image components from noise components;
   d. repeating step c. with each group of pixel image values corresponding to groups of pixels aligned along the predetermined direction, the position of which group is translated by a fixed number of pixels with respect to the preceding group;
   e. accumulating and averaging the image value components from every group contributing to each image element so as to provide an array of processed pixel image values having a partially reduced noise component;
   f. repeating steps b. to e. with groups of pixel image values having noise components partially reduced by the former processing steps, these groups of pixel image values corresponding to groups of pixels aligned along a succession of other directions, whereby the noise component of the image is effectively reduced.

2. A method according to claim 1, comprising the additional steps of repeating steps b. to f. with several contiguous bandpass versions of the original image data, and combining the outputs of the various partial bandpass processings to obtain final processed image values in which the noise component is further reduced.

3. A method according to claim 1, comprising the additional steps of filtering the original image data so as to obtain a lowpass version and several bandpass versions of this data, and repeating steps b. to f. first with the lowpass version of the image data, then with the lowpass version added to the version of the adjacent bandpass, and so on up to the addition of the version corresponding to the highest bandpass, so obtaining final processed image values in which the noise component is further reduced.

4. A method according to any one of claims 1 to 3, wherein the order of the successive directions of alignment of the groups of pixels corresponding to the pixel image values for which the processing is in progress is periodically changed.

5. A method according to claim 4, where in the periodic change is made each time a set of pixel image values corresponding to a new line of pixels is entered into the sequence of processing steps.

6. A method according to claim 5, wherein the groups of pixels are successively aligned with a first diagonal direction, the horizontal or vertical direction, the vertical or horizontal direction, respectively, and a second diagonal direction, and wherein when a new set of pixel image values correspondng to a new line of pixels is entered into the sequence of processing steps, the first and second diagonal directions are exchanged.

* * * * *